United States Patent
Marcano et al.

(10) Patent No.: US 12,538,283 B2
(45) Date of Patent: Jan. 27, 2026

(54) SIDELINK COMMUNICATION

(71) Applicant: Nokia Technologies Oy, Espoo (FI)

(72) Inventors: Andrea Marcano, Massy (FR); Luis Guilherme Uzeda Garcia, Massy (FR); Alvaro Valcarce Rial, Massy (FR); Guillaume Decarreau, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 325 days.

(21) Appl. No.: 18/551,326

(22) PCT Filed: Feb. 17, 2022

(86) PCT No.: PCT/EP2022/053914
§ 371 (c)(1),
(2) Date: Sep. 19, 2023

(87) PCT Pub. No.: WO2022/199951
PCT Pub. Date: Sep. 29, 2022

(65) Prior Publication Data
US 2024/0196385 A1     Jun. 13, 2024

(30) Foreign Application Priority Data
Mar. 26, 2021 (FI) .................................. 20215348

(51) Int. Cl.
*H04W 72/0453* (2023.01)
*H04W 88/04* (2009.01)

(52) U.S. Cl.
CPC ........ *H04W 72/0453* (2013.01); *H04W 88/04* (2013.01)

(58) Field of Classification Search
CPC ........................... H04W 72/0453; H04W 88/04
See application file for complete search history.

(56) References Cited

U.S. PATENT DOCUMENTS

2019/0372647 A1    12/2019  Su et al.

FOREIGN PATENT DOCUMENTS

| CN | 111787624 A | 10/2020 |
|----|-------------|---------|
| WO | 2019236714 A1 | 12/2019 |

(Continued)

OTHER PUBLICATIONS

SA WG1: "New WID on Study on traffic characteristics and performance requirements for AI/ML model transfer in 5GS (from S1-193606)", 3GPP TSG SA Meeting #86, Dec. 10-13, 2019, Sitges, Spain, SP-1910040 (Year: 2019).*

(Continued)

*Primary Examiner* — Joseph A Bednash
(74) *Attorney, Agent, or Firm* — Carter, DeLuca & Farrell LLP (57) ABSTRACT

A method comprising transmitting, to an access node, a first indication indicating that a first terminal device is available for machine learning training with data obtained from sidelink communication, receiving, from the access node, a second indication indicating a configuration for a machine learning bandwidth part, performing a machine learning training negotiation with a second terminal device in the machine learning bandwidth part, and executing the machine learning training with the data obtained from the sidelink communication in the machine learning bandwidth part.

15 Claims, 6 Drawing Sheets

(56) References Cited

FOREIGN PATENT DOCUMENTS

| WO | 2021044820 | A1 | 3/2021 |
| WO | 2021234027 | A2 | 11/2021 |
| WO | 2021244756 | A1 | 12/2021 |

OTHER PUBLICATIONS

Moderator (Samsung), "FL summary for thread 1 on maintenance for 5G V2X with NR sidelink", 3GPP TSG RAN WG1 #102-e Meeting, e-meeting, Aug. 17-28, 2020, R1-2009847 (Year: 2020).*

Deepika Mohan et al: "Machine Learning Algorithm for NLOS Millimeter Wave in 5G V2X Communication", arxiv.org, Cornell University Library, 201 Olin Library Cornell University Ithaca, NY 14853, Dec. 16, 2020, XP081844325 (Year: 2020).*

Moreira Darlan C et al: "QOS Predictability in V2X Communication with Machine Learning", 2020 IEEE 91 St Vehicular Technology Conference (VTC2020-Spring), IEEE, May 25, 2020, pp. 1-5, XP033787230 (Year: 2020).*

"Revised WID on 5G V2X with NR sidelink ", 3GPP TSG RAN Meeting #84, RP-190984, Agenda: 9.4.8, LG Electronics, Jun. 3-6, 2019, 8 pages.

"3rd Generation Partnership Project; Technical Specification Group Radio Access Network; NR; Study on NR Vehicle-to-Everything (V2X) (Release 16)", 3GPP TR 38.885, V16.0.0, Mar. 2019, pp. 1-122.

Kim et al., "Autonomous Power Allocation Based on Distributed Deep Learning for Device-to-Device Communication Underlaying Cellular Network", IEEE Access, vol. 8, Jun. 5, 2020, pp. 107853-107864.

"Architectural framework for machine learning in future networks including IMT-2020", Series Y: Global Information Infrastructure, Internet Protocol Aspects, Next-Generation Networks, Internet Of Things And Smart Cities, Future Netwoks, ITU-T Y.3172, Jun. 2019, 31 pages.

Office action received for corresponding Finnish Patent Application No. 20215348, dated Sep. 2, 2021, 10 pages.

"Distributed ML using D2D communication", 3GPP TSG-SA WG1 Meeting #93e, S1-210058, Agenda: 7.4.1, OPPO, Feb. 22-Mar. 4, 2021, 6 pages.

"Discussion on AI/ML Model Transfer in 5GS", 3GPP SA WG1 #88, S1-193039, OPPO, Nov. 18-22, 2019, pp. 1-13.

Office action received for corresponding Finnish Patent Application No. 20215348, dated Feb. 17, 2022, 8 pages.

International Search Report and Written Opinion received for corresponding Patent Cooperation Treaty Application No. PCT/EP2022/053914, dated Jun. 21, 2022, 15 pages.

"New WID on Study on traffic characteristics and performance requirements for AI/ML model transfer in 5GS (from S1-193606)", 3GPP TSG SA Meeting #86, SP-191040, Agenda: 6.6, SA WG1, Dec. 10-13, 2019, 3 pages.

"FL summary for thread 1 on Maintenance for 5G V2X with NR sidelink", 3GPP TSG RAN WG1 #102-e Meeting, R1-2009847, Agenda: 7.2.4, Samsung, Aug. 17-28, 2020, 35 pages.

Mohan et al., "Machine Learning Algorithm for NLOS Millimeter Wave in 5G V2x Communication", 7th International conference on Computer Networks and Communications (CCNET 2020), 2020, pp. 63-76.

Moreira et al., "QoS Predictability in V2X Communication with Machine Learning", IEEE 91st Vehicular Technology Conference (VTC-Spring), May 25-28, 2020, 5 pages.

"Discussion on potential positioning enhancements", 3GPP TSG RAN WG1 #102-e, R1-2005381, Agenda: 8.5.3, vivo, Aug. 17-28, 2020, 20 pages.

Li et al., "Adaptive Sample Weight for Machine Learning Computer Vision Algorithms in V2X Systems", IEEE Access, vol. 7, Dec. 21, 2018, pp. 4676-4687.

Notice of Allowance received for corresponding European Patent Application No. 22710959.2, dated Mar. 10, 2025, 7 pages.

* cited by examiner

SIDELINK COMMUNICATION

RELATED APPLICATION

This application was originally filed as PCT Application No. PCT/EP2022/053914, filed on Feb. 17, 2022, which claims priority from FI application No. 20215348, filed on Mar. 26, 2021, each of which is incorporated herein by reference in its entirety.

FIELD

The following exemplary embodiments relate to wireless communication and transmitting information between two or more devices.

BACKGROUND

Wireless communication may take place between terminal devices via an access node. Such communication may be seen as a hierarchical communication. While it has its benefits, there may also be communication taking place directly between two or more devices without having an access node in-between.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to transmit, to an access node, a first indication indicating that a first terminal device is available for machine learning training for sidelink communication with data obtained from the sidelink communication, receive, from the access node, a second indication indicating a configuration for a machine learning bandwidth part, perform a machine learning training negotiation with a second terminal device using the machine learning bandwidth part, and execute the machine learning training with the data obtained from the sidelink communication in the machine learning bandwidth part between the first terminal device and the second terminal device.

According to a second aspect there is provided an apparatus comprising means for transmitting, to an access node, a first indication indicating that a first terminal device is available for machine learning training for sidelink communication with data obtained from the sidelink communication, receiving, from the access node, a second indication indicating a configuration for a machine learning bandwidth part, performing a machine learning training negotiation with a second terminal device in the machine learning bandwidth part, and executing the machine learning training with the data obtained from the sidelink communication in the machine learning bandwidth part between the first terminal device and the second terminal device.

According to a third aspect there is provided a method comprising transmitting, to an access node, a first indication indicating that a first terminal device is available for machine learning training for sidelink communication with data obtained from the sidelink communication, receiving, from the access node, a second indication indicating a configuration for a machine learning bandwidth part, performing a machine learning training negotiation with a second terminal device using the machine learning bandwidth part, and executing the machine learning training with the data obtained from the sidelink communication in the machine learning bandwidth part between the first terminal device and the second terminal device.

According to a fourth aspect there is provided a computer program comprising instructions for causing an apparatus to perform at least the following: transmit, to an access node, a first indication indicating that a first terminal device is available for machine learning training for sidelink communication with data obtained from the sidelink communication, receive, from the access node, a second indication indicating a configuration for a machine learning bandwidth part, perform a machine learning training negotiation with a second terminal device using the machine learning bandwidth part, and execute the machine learning training with the data obtained from the sidelink communication in the machine learning bandwidth part between the first terminal device and the second terminal device.

According to a fifth aspect there is provided a computer program product comprising instructions for causing an apparatus to perform at least the following: transmit, to an access node, a first indication indicating that a first terminal device is available for machine learning training for sidelink communication with data obtained from the sidelink communication, receive, from the access node, a second indication indicating a configuration for a machine learning bandwidth part, perform a machine learning training negotiation with a second terminal device using the machine learning bandwidth part, and execute the machine learning training with the data obtained from the sidelink communication in the machine learning bandwidth part between the first terminal device and the second terminal device.

According to a sixth aspect there is provided a computer program comprising instructions stored thereon for performing at least the following: transmit, to an access node, a first indication indicating that a first terminal device is available for machine learning training for sidelink communication with data obtained from the sidelink communication, receive, from the access node, a second indication indicating a configuration for a machine learning bandwidth part, perform a machine learning training negotiation with a second terminal device using the machine learning bandwidth part, and execute the machine learning training with the data obtained from the sidelink communication in the machine learning bandwidth part between the first terminal device and the second terminal device.

According to a seventh aspect there is provided a non-transitory computer readable medium comprising program instructions for causing an apparatus to perform at least the following: transmit, to an access node, a first indication indicating that a first terminal device is available for machine learning training for sidelink communication with data obtained from the sidelink communication, receive, from the access node, a second indication indicating a configuration for a machine learning bandwidth part, perform a machine learning training negotiation with a second terminal device using the machine learning bandwidth part, and execute the machine learning training with the data obtained from the sidelink communication in the machine learning bandwidth part between the first terminal device and the second terminal device.

According to an eight aspect there is provided non-transitory computer readable medium comprising program instructions stored thereon for performing at least the following: transmit, to an access node, a first indication indicating that a first terminal device is available for machine learning training for sidelink communication with data obtained from the sidelink communication, receive, from the access node, a second indication indicating a configuration for a machine learning bandwidth part, perform a machine learning training negotiation with a second terminal device using the machine learning bandwidth part, and execute the machine learning training with the data obtained from the sidelink communication in the machine learning bandwidth part between the first terminal device and the second terminal device.

According to a ninth aspect there is provided an apparatus comprising at least one processor, and at least one memory including a computer program code, wherein the at least one memory and the computer program code are configured, with the at least one processor, to cause the apparatus to receive, from a first terminal device, a first indication indicating that the first terminal device is available for machine learning training for sidelink communication with data obtained from the sidelink communication, provide to the first terminal device a second indication indicating a configuration for a machine learning bandwidth part, receive, from a second terminal device, a third indication indicating that the second terminal device is available for the machine learning training for the sidelink communication with the data obtained from the sidelink communication, provide to the second terminal device a fourth indication indicating the configuration for the machine learning bandwidth part, and obtain from at least one of the first and the second terminal devices data obtained during the machine learning training for the sidelink communication with the data obtained from the sidelink communication between the first terminal device and the second terminal device.

According to a tenth aspect there is provided an apparatus comprising means for receiving, from a first terminal device, a first indication indicating that the first terminal device is available for machine learning training for sidelink communication with data obtained from the sidelink communication, providing to the first terminal device a second indication indicating a configuration for a machine learning bandwidth part, receiving, from a second terminal device, a third indication indicating that the second terminal device is available for the machine learning training for the sidelink communication with the data obtained from the sidelink communication, providing to the second terminal device a fourth indication indicating the configuration for the machine learning bandwidth part, and obtaining from at least one of the first and the second terminal devices the data obtained during the machine learning training for the sidelink communication with the data obtained from the sidelink communication between the first terminal device and the second terminal device.

According to an eleventh aspect there is provided a method comprising receiving, from a first terminal device, a first indication indicating that the first terminal device is available for machine learning training for sidelink communication with data obtained from the sidelink communication, providing to the first terminal device a second indication indicating a configuration for a machine learning bandwidth part, receiving, from a second terminal device, a third indication indicating that the second terminal device is available for the machine learning training for the sidelink communication with the data obtained from the sidelink communication, providing to the second terminal device a fourth indication indicating the configuration for the machine learning bandwidth part, and obtaining from at least one of the first and the second terminal devices data obtained during the machine learning training for the sidelink communication with the data obtained from the sidelink communication between the first terminal device and the second terminal device.

According to a twelfth aspect there is provided a computer program comprising instructions for causing an apparatus to perform at least the following: receive, from a first terminal device, a first indication indicating that the first terminal device is available for machine learning training for sidelink communication with data obtained from the sidelink communication, provide to the first terminal device a second indication indicating a configuration for a machine learning bandwidth part, receive, from a second terminal device, a third indication indicating that the second terminal device is available for the machine learning training for the sidelink communication with the data obtained from the sidelink communication, provide to the second terminal device a fourth indication indicating the configuration for the machine learning bandwidth part, and obtain from at least one of the first and the second terminal devices data obtained during the machine learning training for the sidelink communication with the data obtained from the sidelink communication between the first terminal device and the second terminal device.

According to a thirteenth aspect there is provided a computer program product comprising instructions for causing an apparatus to perform at least the following: receive, from a first terminal device, a first indication indicating that the first terminal device is available for machine learning training for sidelink communication with data obtained from the sidelink communication, provide to the first terminal device a second indication indicating a configuration for a machine learning bandwidth part, receive, from a second terminal device, a third indication indicating that the second terminal device is available for the machine learning training for the sidelink communication with the data obtained from the sidelink communication, provide to the second terminal device a fourth indication indicating the configuration for the machine learning bandwidth part, and obtain from at least one of the first and the second terminal devices data obtained during the machine learning training for the sidelink communication with the data obtained from the sidelink communication between the first terminal device and the second terminal device.

According to a fourteenth aspect there is provided a computer program comprising instructions stored thereon for performing at least the following: receive, from a first terminal device, a first indication indicating that the first terminal device is available for machine learning training for sidelink communication with data obtained from the sidelink communication, provide to the first terminal device a second indication indicating a configuration for a machine learning bandwidth part, receive, from a second terminal device, a third indication indicating that the second terminal device is available for the machine learning training for the sidelink communication with the data obtained from the sidelink communication, provide to the second terminal device a fourth indication indicating the configuration for the machine learning bandwidth part, and obtain from at least one of the first and the second terminal devices data obtained during the machine learning training for the sidelink communication with the data obtained from the sidelink communication between the first terminal device and the second terminal device.

According to a fifteenth aspect there is provided a non-transitory computer readable medium comprising program instructions for causing an apparatus to perform at least the following: receive, from a first terminal device, a first indication indicating that the first terminal device is available for machine learning training for sidelink communication with data obtained from the sidelink communication, provide to the first terminal device a second indication indicating a configuration for a machine learning bandwidth part, receive, from a second terminal device, a third indication indicating that the second terminal device is available for the machine learning training for the sidelink communication with the data obtained from the sidelink communication, provide to the second terminal device a fourth indication indicating the configuration for the machine learning bandwidth part, and obtain from at least one of the first and the second terminal devices data obtained during the machine learning training for the sidelink communication with the data obtained from the sidelink communication between the first terminal device and the second terminal device.

According to a sixteenth aspect there is provided non-transitory computer readable medium comprising program instructions stored thereon for performing at least the following: receive, from a first terminal device, a first indication indicating that the first terminal device is available for machine learning training for sidelink communication with data obtained from the sidelink communication, provide to the first terminal device a second indication indicating a configuration for a machine learning bandwidth part, receive, from a second terminal device, a third indication indicating that the second terminal device is available for the machine learning training for the sidelink communication with the data obtained from the sidelink communication, provide to the second terminal device a fourth indication indicating the configuration for the machine learning bandwidth part, and obtain from at least one of the first and the second terminal devices data obtained during the machine learning training for the sidelink communication with the data obtained from the sidelink communication between the first terminal device and the second terminal device.

LIST OF DRAWINGS

In the following, the invention will be described in greater detail with reference to the embodiments and the accompanying drawings, in which.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

As used herein, the term "determining" (and grammatical variants thereof) may include, as a non-exhaustive listing, for example calculating, computing, processing, deriving, measuring, investigating, looking up (e.g., looking up in a table, a database or another data structure), ascertaining and the like. Also, "determining" may include receiving (e.g., receiving information), accessing (e.g., accessing data in a memory), obtaining and the like. Also, "determining" may include resolving, selecting, choosing, establishing, and the like.

Figure 1:
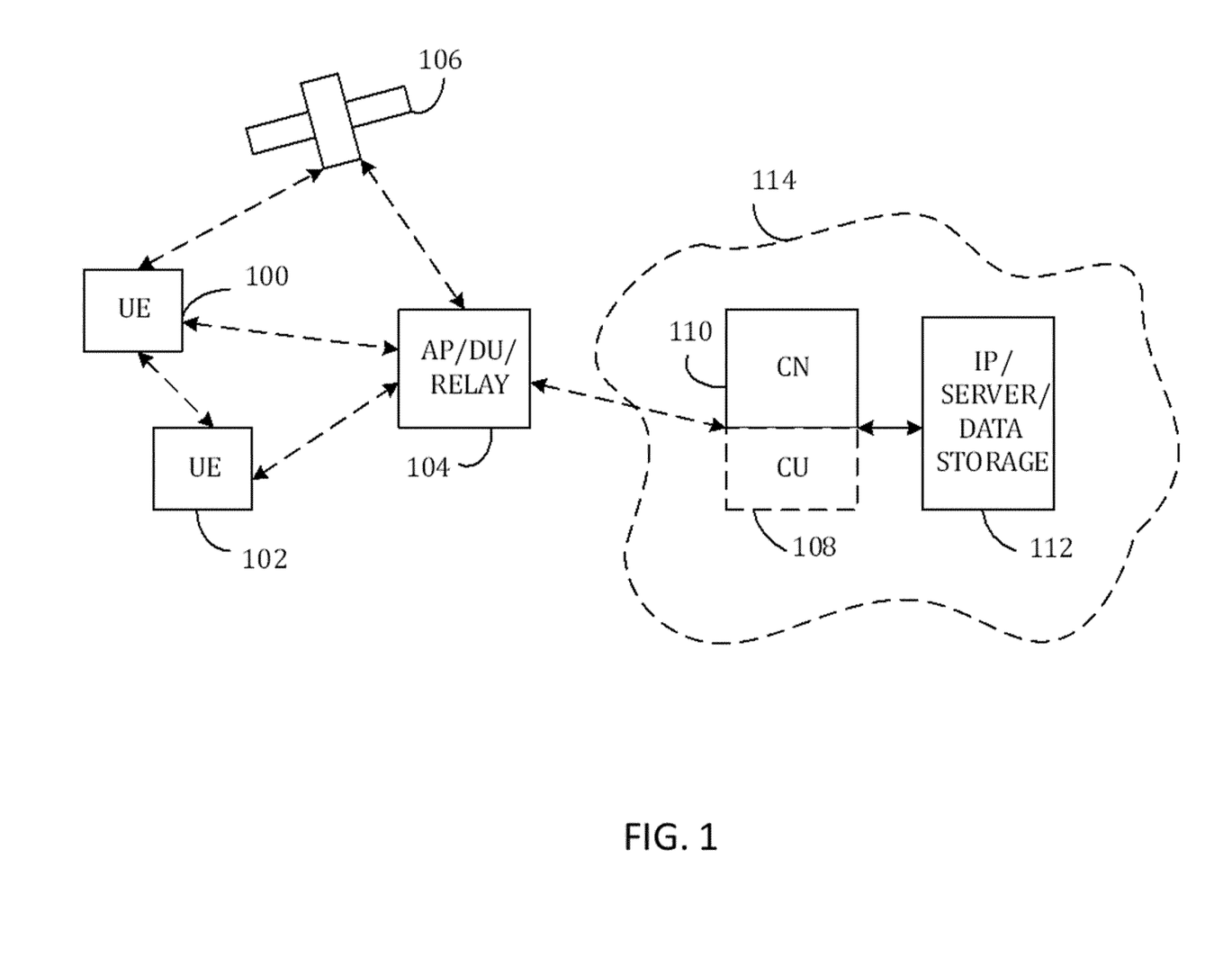
FIG. 1 illustrates an exemplary embodiment of a radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. A terminal device may also be a device having capability to operate in Internet of Things (IOT) network.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHZ, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require to bring the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc.

Machine learning, ML, is utilized in many different areas due to the benefits it offers and ML may also be utilized in wireless communication. For example, an access node may benefit from one or more trained machine learning models that help to improve the performance of the access node. Training of the one or more machine learning models may be done for example at the physical layer, at the upper layers or over the full stack in a holistic manner. Further, an end-to-end training, in which both endpoints of a radio link are trained, may also utilized.

Machine learning models may be categorized broadly as supervised or unsupervised. Supervised models may apply what has been learned in the past using labelled examples to predict future events. A supervised algorithm may require a set of data known as training data, comprising input data and labels that are considered as the output values of machine learning algorithms. Starting from the analysis of the training data, the machine learning algorithm produces a model, such as a mathematical model, that makes predictions about the output values. After sufficient training, the model may provide accurate output values for any new input data. The accuracy of the model, that is, the adequacy of the training may be validated by techniques such as cross-validation method. When training, some part of the labelled training data is not used for training but saved for estimating the model accuracy, that is, if the model gives a correct label to an already known output value. An unsupervised algorithm in turn takes a set of data that comprises input data without labels and finds a structure in the input data, like grouping or clustering of data points. Therefore, unsupervised methods do not need a labelled input data for training in contrast to supervised methods but may learn from input data that has not been labelled. Multiple supervised machine learning models exist and one example of a supervised machine learning model is an artificial neural network, ANN, which may also be referred to as a neural network, NN. An artificial neural network comprises connected neurons that loosely resemble neurons in a biological brain.

The neurons are computing entities which, when connected, can form one or more layers. The selection of training data has a significant impact on how well the algorithm executed on the framework offered by the neural network, or any other suitable machine learning model, learns to provide correct and reliable results as the algorithm learns to recognize patterns of the training data and thereby is able to recognize new data. As the learning is based on patterns, the better the patterns are extracted from the training data, the better the algorithm can learn.

To achieve more flexibility in how resources are assigned in a given carrier, bandwidth parts may be utilized. A bandwidth part, BWP, may be understood as a contiguous set of physical resource blocks, PRB, on a given carrier. The PRBs may be selected from a contiguous subset of common resource blocks for a given numerology. Utilization of BWPs may enable for example receiver-side bandwidth adaptation, power saving, multiplexing of numerologies and narrowband and wideband terminal devices. The bandwidth of individual BWPs may vary but it may be limited such that it is not wider than the carrier bandwidth or the maximum bandwidth supported by the terminal device.

When a terminal device is connected to a cell provided by an access node that is part of the cellular network, it may be allocated its own BWP configuration according to its service profiles. Thus, the BWP may be configured for the terminal device. For example, up to 4 BWPs may be configured for the terminal device by the network via radio resource control, RRC, signalling. If a plurality of BWPs are allocated to the terminal device, it may be that there is one BWP that is active at any given time. Such active BWP may serve as the portion of the carrier bandwidth in which the terminal device monitors data and control signalling. Thus, the terminal device may not be required to monitor signals outside the bandwidth of the active BWP. The network may then provide an indication to the terminal device indicating that switching between BWPs that are configured for the terminal device is to take place. The indication may be provided using for example downlink control information, DCI, in order to adapt the bandwidth and/or the numerology to the data traffic. An advantage associated with BWPs is that it enables dedicating a portion of the carrier for a specific purpose. Although BWPs and their configurations are specific to a terminal device, the network may configure same BWPs to such terminal devices that share a similar traffic activity in order to optimize the carrier resources configuration as well as to ease the scheduler when allocating such resources.

In 5G, for example, in addition to BWPs, unlicensed spectrum may also be utilized to achieve increased flexibility in terms of spectrum usage. The unlicensed spectrum in 5G may be denoted as NR-U. Utilization of the NR-U may enable delivering multi-Gbps peak data rates with up to 400 MHz and 100 MHz of bandwidth available for downlink and uplink, respectively. Both anchored and standalone deployments may be supported for NR-U, thereby providing operators more spectrum flexibility. It is also to be noted that the concept of BWP applies for both the NR-U and NR.

Sidelink communication may be understood as communication between terminal devices in which the terminal devices connect to each other directly without an access node involvement, in other words, without relaying the data via a network such as a cellular communication network. Such terminal devices may be of any suitable type such as mobile phones, vehicles, robots, household appliances or wearable consumer electronic devices. Sidelink communication may be enabled for example by 5G and/or 4G technology. Sidelink communication may be beneficial for example to allow devices with close proximity to each other to discover and connect to each other at high data rates and low latency. This may be useful for example in peer-to-peer gaming, vehicle platooning, etc. Also enhanced augmented reality and/or virtual reality may benefit from sidelink communication.

In sidelink communication, resource allocations as well as link adaptation are controlled by the terminal devices independently, which allows more control over usage of its resources to a terminal device. As sidelink communication allows reduction in latency due to being restricted to one hop, it may be useful for example in mission-critical industrial applications.

The physical layer resources required for sidelink communication between a plurality of devices may be scheduled by an access node such as a gNB or, alternatively, may be autonomously selected by the terminal devices in a contention-based manner. Three physical channels may be specified for example to a vehicle to X, V2X, sidelink communication. Those physical channels may be physical sidelink control channel, PSCCH, that comprises sidelink control information, SCI, physical sidelink shared channel, PSSCH, and physical sidelink feedback channel, PSFCH. The PSCCH and PSSCH are time-division-multiplexed to enable low latency and energy efficiency. It is also envisaged that extensions to multi-carrier operation and enhancements for mmWave operation may enhance sidelink communication. In addition to physical layer, resource management may also be optimized to increase the system capacity in addition to reducing capacity.

Figure 2A:
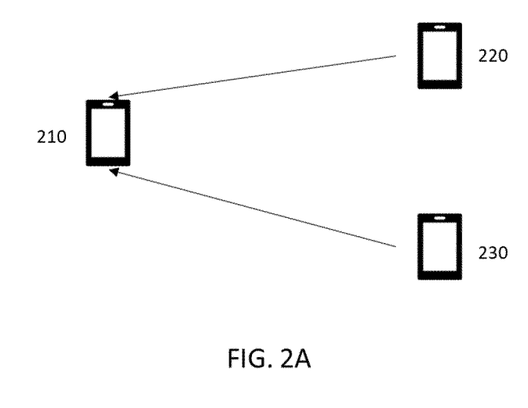
FIG. 2A illustrates an exemplary embodiment of sidelink communication between terminal devices.

FIG. 2A illustrates an exemplary embodiment of sidelink communication between terminal devices 210, 220 and 230. In this exemplary embodiment the terminal devices 210, 220 and 230 are mobile phones, but other terminal devices and/or network infrastructures could also be used. In this exemplary embodiment terminal device 210 receives sidelink transmissions of data from both the terminal device 220 and the terminal device 230, which in this exemplary embodiment act as Tx terminal devices.

To optimize performance of terminal devices, which may comprise mobile devices, wearable device, household appliances and vehicles for example, that are capable of communicating via sidelink communication, machine learning may be utilized. To be able to train machine learning for improving performance of terminal devices, it is beneficial to have messages and procedures to steer such training methods efficiently in sidelink connections. Yet, training a machine learning model requires transmitting a large amount of data through the use of radio resources that need to be allocated for this purpose on top of usual usage of the resources, which may temporarily reduce the capacity of the network. Sidelink communications aggravates this issue as the sheer presence of multiple active sidelinks with ML training capabilities scales up the number of resources occupied for ML purposes. It may thus be beneficial to leverage spectral flexibility to optimize network capacity when sidelink ML-training takes place in a cellular communication network.

To obtain spectral flexibility when ML training is to take place for sidelink communication, BWPs may be utilized. For example, data transmissions regarding the ML training may take place in dedicated radio frequencies and BWPs may be used to achieve such dedicated radio frequencies. Also, as the terminal devices performing the sidelink communication may be in close proximity to each other, effective power control by means of purpose-specific BWPs for ML-training of links used for the sidelink communication may be achieved. This may help to minimize RF interference and the impact of ML training on network capacity.

Radio resource management, RRM, may be understood as a network task that aims to maximize throughput and spectral efficiency. This may be achieved for example by deciding how and to which terminal devices radio resources such as power, frequency and connection duration are allocated. In the following exemplary embodiments, RRM procedures for configuring, enabling, disabling and controlling ML training regarding sidelink communication are discussed. The data transmissions for the ML training may be transmitted using a BWP that is allocated for such data transmissions. The BWP may be called as Machine Learning BWP, ML BWP. Such ML BWPs may be utilized for the training and data transmissions without heavily compromising the network performance. This also facilitates the scheduler RRM decisions for ML purposes. The ML training regarding sidelink communication may be understood as training one or more machine learning models regarding one or more aspects of the sidelink communication.

Figure 2B:
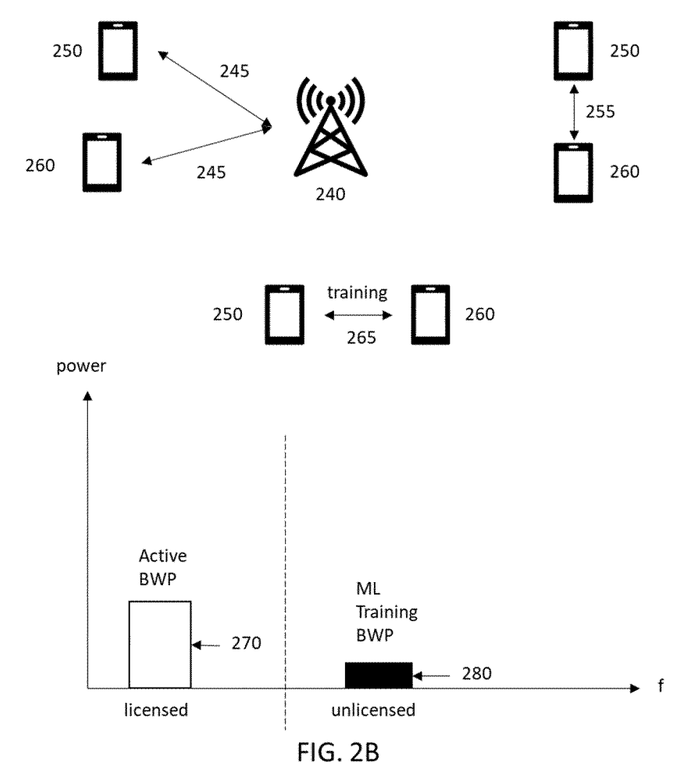
FIG. 2B illustrates an exemplary embodiment of network topology and spectral allocation for machine learning training in sidelink communication.

FIG. 2B illustrates an exemplary embodiment of network topology and spectral allocation for ML training in sidelink communication. In this exemplary embodiment, there are two terminal devices 250 and 260, that may be any suitable devices that are capable of performing sidelink communication and that comprise a transceiver. First, the terminal devices 250 and 260 indicate 245 to an access node 240, that in this exemplary embodiment is a gNB, that they are available for sidelink communication and training of an ML regarding the sidelink communication. In this exemplary embodiment, the purpose of the ML training is to optimize device-to-device MAC-layer. Thus, the terminal devices 250 and 260 request, from the access node 240, resources for the ML training. In order to be able to perform the ML training, two transceivers that are involved in the sidelink communication may be required. As a response, the access node 240 may allocate resources, such as ML BWPs in an NR-U spectrum or in high 5G bands, such as in frequency range 2, FR2, for the ML training. FR2 may include frequency bands from 24.25 GHz to 52.6 GHz. This may have the benefit of exploiting spectrum availability, as well as bringing full flexibility to the configuration of the lower layers, which may not need to reuse the configuration, such as numerology, of the same transceiver.

As the terminal devices 250 and 260 perform sidelink communication 255 between each other, the communication may take place in a licensed spectrum using an active BWP 270. Also, data transmissions for ML training may take place in an unlicensed spectrum using an ML BWP 280 for data transmissions aimed to transmit the training data. Thus, the terminal devices 250 and 260 are allocated a ML BWP for transmitting and receiving data, that may be used for the training, in this allocated spectrum, using for example a PC5 interface, without having to receive a control signal from the access node 240. In other words, the access node 240 may configure the ML BWP for the terminal devices to use for the ML training. Also, the ML data collection may then take place in this allocated spectrum, without perturbing other user in the carrier spectrum and without any need for DL control signals from the access node 240 for ML purposes. It is to be noted that in some exemplary embodiments, the ML BWP may be used only for the training purpose.

If an ML BWP is used in a sidelink communication to transmit training data and if the terminal devices also support operating in NR-U or FR2, the ML BWP may be in the NR-U or FR2, which helps the network, that may be a cellular communication network, to use tailored RRM algorithms for the ML BWP without interfering with the RRM setting for other data traffic. As spectrum is a scarce and valuable resource, moving the training data to NR-U or FR2 helps to keep as much of that resource available for other data transmissions. It is to be noted though that subsequent allocation of resources within the ML BWP and medium access control definition may be carried out autonomously by the terminal devices engaged in communications over the sidelink.

Figure 3:
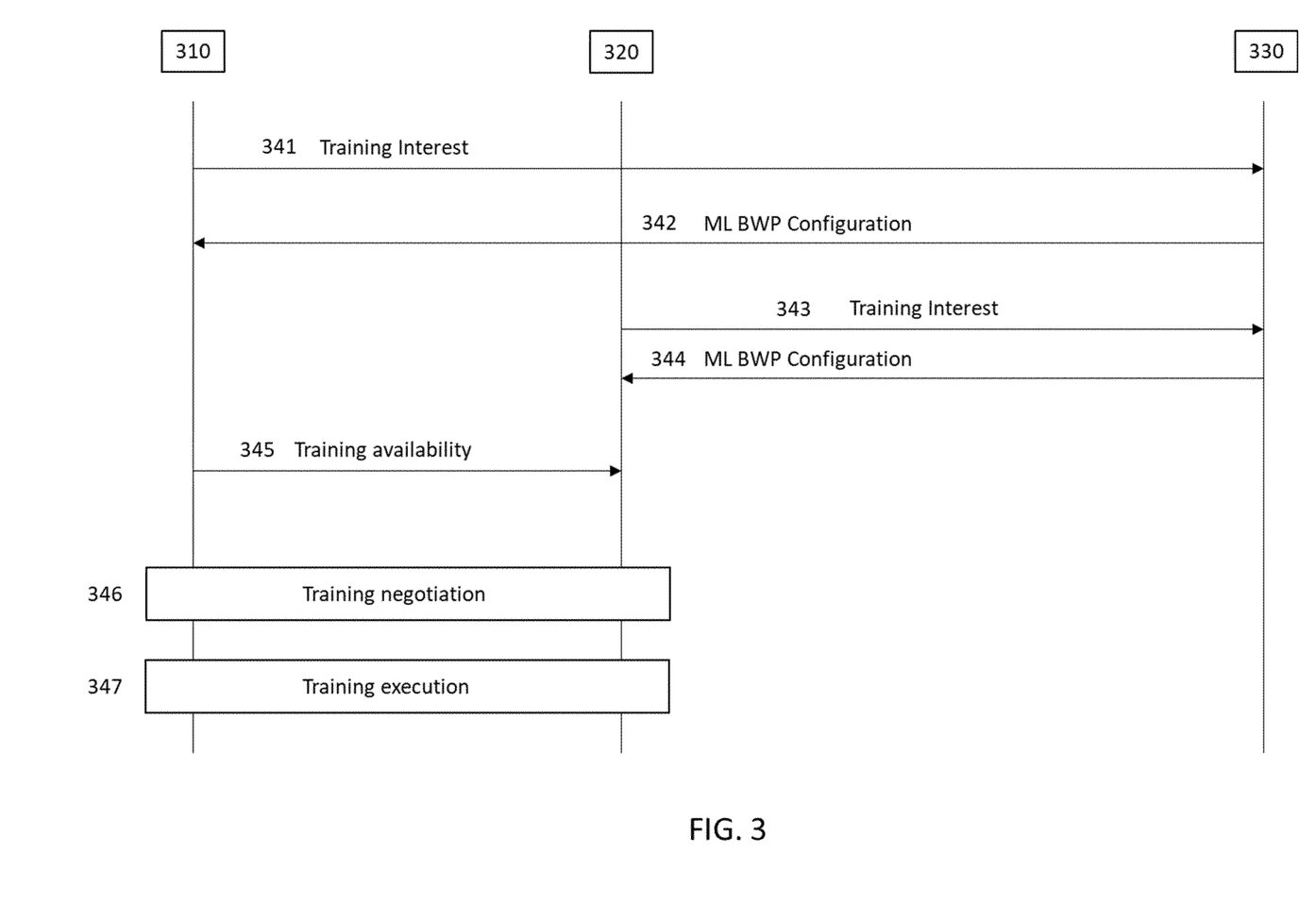
FIGS. 3, 4A and 4B illustrate exemplary embodiments of signalling.

FIG. 3 illustrates an exemplary embodiment of signalling for initiating and performing data transmissions for training a machine learning model regarding sidelink communication. First a terminal device 310, which is capable of sidelink communication, transmits an indication 341 that indicates that the terminal device 310 is available for ML training with data obtained from sidelink communication. This indication is provided to a radio access network, RAN, such that an access node 330 such as a gNB, receives the transmitted indication 341, which may be understood as a TrainingInterest message. The indication 341 may be, for example, an optional information element, IE, comprised in a SidelinkUEInformation message.

Provided that sidelink ML training sessions are supported by the RAN and the RAN determines the terminal device 310 as an authorized terminal device for the sidelink training session, the access node 330 may then transmit an indication 342 to the terminal device 310. The indication 342 indicates a configuration for an ML BWP for the purpose of providing and obtaining training data for the ML training with the data obtained from the sidelink communication. The indication 342 may be understood as a ML BWP Configuration message. The indication 342 may be, for example, an optional IE of a RRCConnectionReconfiguration message. Once the terminal device 310 receives the indication 342, the terminal device 310 may, from then on, monitor for ML-training sidelink discovery announcements in the ML-BWP. It is to be noted that the indication 342 may further comprise rules and restrictions for sidelink ML-training, including carrier frequency, maximum transmit power, transmission mode, etc.

The ML BWP Configuration message may also comprise an indication for data collection such as a data collection flag. This flag may be used to indicate to the terminal device 310 that it is to store SL ML data collected during training sessions. The data may then later on be provided to the RAN if the RAN decides to retrieve this data from the terminal device. This may have the benefit of, effectively, extending the range of the network and letting it collect ML data in regions it cannot otherwise reach such as out-of-coverage regions and high frequencies. It is to be noted that the ML BWP may be allocated in an NR-U spectrum or in high 5G bands, such as in frequency range 2, FR2.

Another terminal device, terminal device 320 may also transmit an indication 343 to the RAN indicating its availability for ML training with the data obtained from the sidelink communication. The indication 343 may be transmitted to an access node that in this exemplary embodiment is the access node 330 to which the terminal device 310 also transmitted the indication 341. The indication 343 may also be understood as a TrainingInterest message and it may be transmitted, for example, an optional information element, IE, comprised in a SidelinkUEInformation message.

As previously with terminal device 310, the RAN then determines if the terminal device 320 is an authorized terminal device for the sidelink training session and if it is, the access node 330 may then transmit an indication 344 to the terminal device 320. The indication 344 indicates the configuration for an ML BWP for the purpose or providing and obtaining training data for ML training with the data obtained from the sidelink communication. The ML BWP may be the same ML BWP as was configured for the terminal device 310. The indication 344 may also be understood as the ML BWP Configuration message. The indication 344 may be, for example, an optional IE of a RRCConnectionReconfiguration message. Once the terminal device 320 receives the indication 344, the terminal device 320 may, from then on, monitor for ML-training sidelink discovery announcements in the ML-BWP.

As there are now two transceivers comprised in terminal devices available, the training data required for machine learning in terms of sidelink communication may now take place. In this exemplary embodiment, the terminal device 310 then transmits an indication 345 to the terminal device 320. The indication 345 indicates that the terminal device 310 is available for training a machine learning model regarding the sidelink communication. The indication 345 may be understood as a training availability-message. It is to be noted that the terminal device 310 may provide the indication 345 as an announcement that announces its availability for the ML training regarding sidelink communication to one or more terminal devices that are located in its vicinity. The availability may be announced in accordance with the ML BWP configuration-message that was provided by the access node 330. The message 345 may be provided, for example, as an IE of a sidelink discovery announcement-message, which may be accompanied by a sidelink synchronisation signal, SLSS.

Once the message 345 has been provided by the terminal device 310 and the terminal device 320 has received the message 345, the terminal device 310 and 320 may negotiate 346 the training of the machine learning model regarding the sidelink communication. The negotiation may be performed using for example the ML BWP that was provided by the access node 330 and configured by the RAN the access node 330 is part of. After this, the terminal device 310 and 320 may execute 347 the training of the machine learning model regarding the sidelink communication.

As described in the exemplary embodiment above, a terminal device that is capable of ML training regarding sidelink communication may monitor frequencies configured by upper layers for ML training availability announcements. If a terminal device detects such availability announcement, a training session may be negotiated and executed with the other terminal device that transmitted the announcement. Once the training has been completed, the terminal devices may resume monitoring of ML training availability announcements. Additionally, the terminal devices may store the learned models and associate them to the training counterpart, that is the other terminal device, for a purpose of customized sidelink communication. The training of the machine learning model may be initiated based on for example lack of RAN coverage or poor performance or based on any other suitable criteria.

Once two terminal devices such as terminal device 310 and 320 have successfully negotiated the machine learning training negotiation such as the negotiation 346, the terminal devices may engage in the ML training regarding sidelink communication for example in NR-U spectrum for the purpose of customizing their radio stacks. After the successful negotiation, the ML training may proceed independently of the RAN. This enables supporting exploratory actions that may be interpreted as harmful to performance by the RAN but which may be an essential for the ML model. Additionally, this allows the terminal devices to venture in out-of-coverage areas the RAN cannot reach and collect useful unexplored data that may be exploited by the RAN as well. The RAN may also request the data collected during exploration to be stored locally to the terminal device that performs the data collection and then later on share it with the RAN during the ML data retrieval procedure.

Figure 4A:
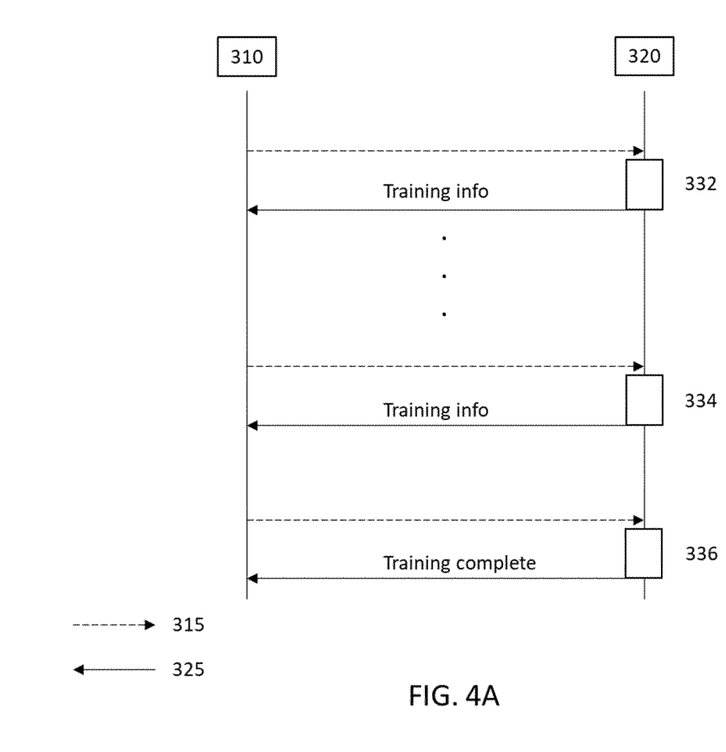

FIG. 4A illustrates an exemplary embodiment of signalling between the terminal device 310 and 320 during the execution of the training of the machine learning model regarding the sidelink communication. In this exemplary embodiment, the machine learning model is trained regarding the receiver, such as L1 receiver, of the terminal device 320. The training of the receiver of the terminal device 320 may help to improve the performance with which the constellation symbols sent by the terminal device 310 are demodulated.

In this exemplary embodiment the terminal device 310 transmits data bursts 315 for training the machine learning model that are then received by the terminal device 320. After this the terminal device 320 performs a training epoch 332, 334 and/or 336. Although three training epochs are illustrated in this exemplary embodiment, there could also be another amount of training epochs. As is illustrated in FIG. 4A, there is a sequence of training epochs, in which the terminal device 310 transmits training data bursts that comprise labelled data. The labelled data may be for example training data that the terminal device 320 needs for example to evaluate its demodulation performance and update its receiver parameters accordingly. After a training epoch, the terminal device 320 then transmits training information to the terminal device 310. This may be done using L3 signalling 325 for example. After the last training epoch, the terminal device 320 transmits to the terminal device 310 a training completed message which may also be transmitted using the L3 interface for example.

Figure 4B:
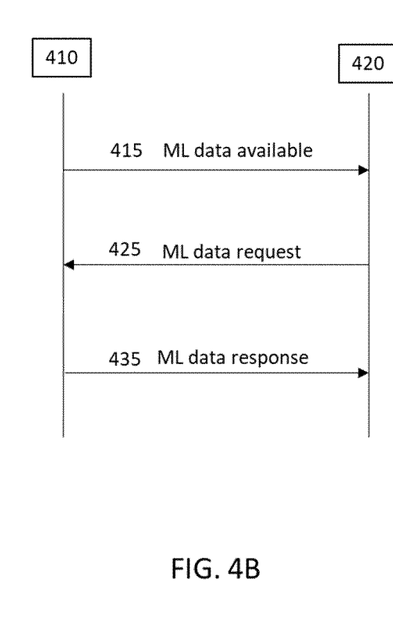

FIG. 4B illustrates an exemplary embodiment of machine learning data retrieval process in which the RAN obtains the training data collected and stored by a terminal device 410. The terminal device transmits an indication 415 indicating that it has training data available to an access node 420 that is comprised in the RAN. This may be for example as following a successful RRC connection establishment. For example, by means of a ML data available flag in the RRCConnectionSetupComplete message. In response to the received indication 415, the access node 420 may then transmit an indication 425 indicating a request to obtain the collected training data from the terminal device 410. After this, the terminal device 410 may provide an indication 435 that may be a response to the request received and transmit the obtained data to the access node 420.

It is to be noted that in some exemplary embodiments the terminal devices may comprise additional transceivers. In such exemplary embodiment, the RAN may transmit, for example via an access node, a command, such as an out-of-band command over a Uu interface to terminate utilization of one or more ML BWPs. The out-of-band command may be transmitted using for example a default BWP in the low- or mid-band frequencies to terminate the utilization of ML BWPs. The command may be transmitted for example as a multicast message that is then received by pertinent terminal devices. Alternatively, the command may be transmitted to a terminal device as a unicast message. The terminal device may then relay the command via the sidelink to the other terminal devices sharing the ML BWP.

Figure 5:
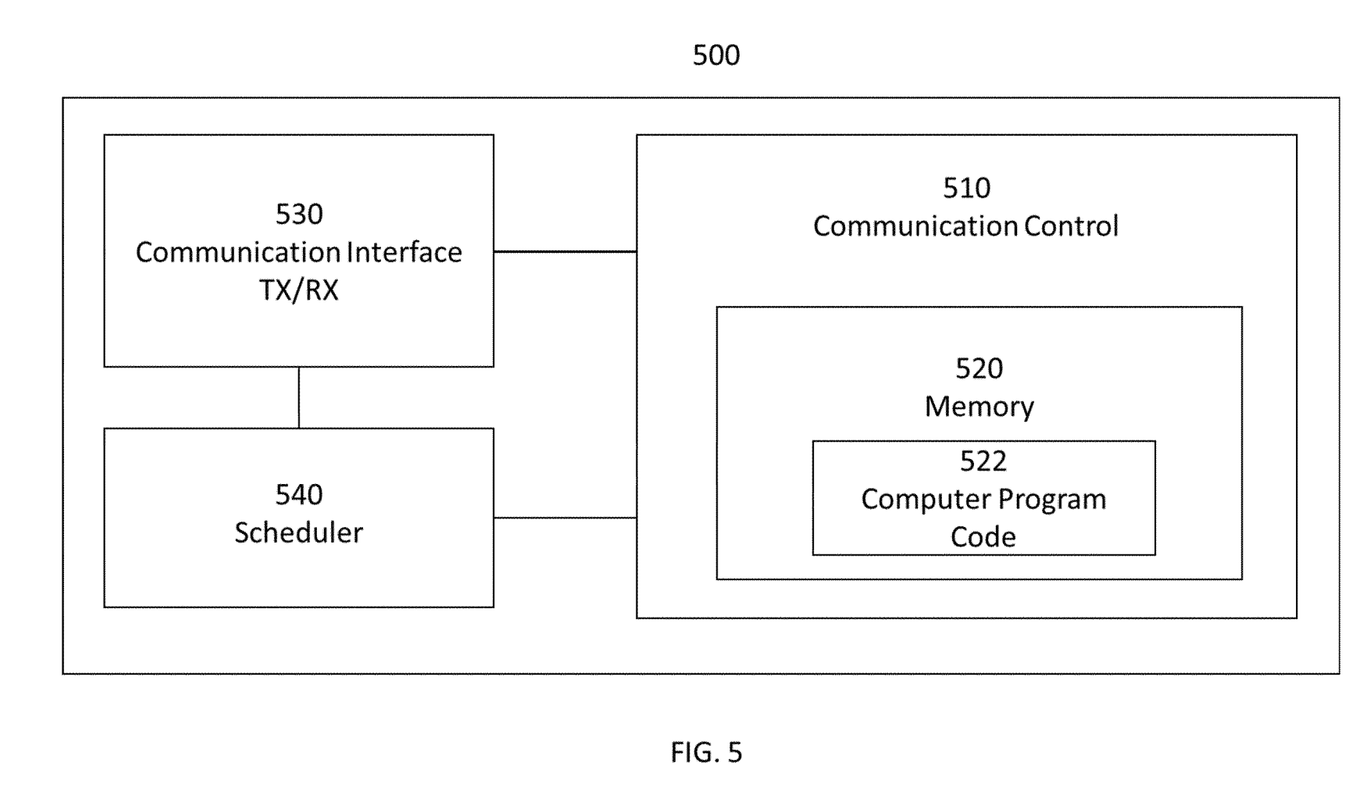
FIGS. 5 and 6 illustrate exemplary embodiments of an apparatus.

The apparatus 500 of FIG. 5 illustrates an example embodiment of an apparatus that may be an access node or be comprised in an access node. The apparatus may be, for example, a circuitry or a chipset applicable to an access node to realize the described embodiments. The apparatus 500 may be an electronic device comprising one or more electronic circuitries. The apparatus 500 may comprise a communication control circuitry 510 such as at least one processor, and at least one memory 520 including a computer program code (software) 522 wherein the at least one memory and the computer program code (software) 522 are configured, with the at least one processor, to cause the apparatus 500 to carry out any one of the example embodiments of the access node described above.

The memory 520 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 500 may further comprise a communication interface 530 comprising hardware and/or software for realizing communication connectivity according to one or more communication protocols. The communication interface 530 may provide the apparatus with radio communication capabilities to communicate in the cellular communication system. The communication interface may, for example, provide a radio interface to terminal devices. The apparatus 500 may further comprise another interface towards a core network such as the network coordinator apparatus and/or to the access nodes of the cellular communication system. The apparatus 500 may further comprise a scheduler 540 that is configured to allocate resources.

Figure 6:
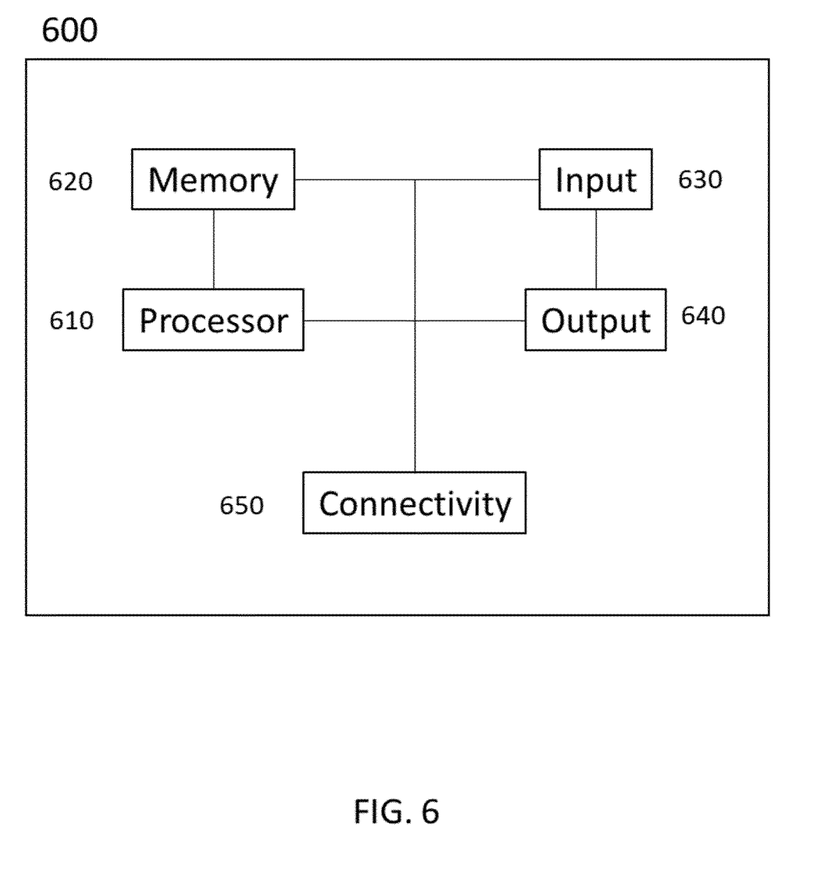

FIG. 6 illustrates an exemplary embodiment of an apparatus that may be comprised in, or connected to, a device that is capable of connecting to a wireless network. A receiving and/or transmitting unit as described above, may be comprised in the device as well. The apparatus 600 comprises a processor 610. The processor 610 interprets computer program instructions and process data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are execute by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The apparatus 600 also comprises an output unit 640. The apparatus 600 may further comprise a connectivity unit 650. The connectivity unit 650 enables wired and/or wireless connectivity to external networks. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit, ASIC.

It is to be noted that the apparatus 600 may further comprise various component not illustrated in the FIG. 6. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising at least one processor, and at least one memory including a computer program code, wherein the at least one memory and the computer program code are configured, with the at least one processor, to cause the apparatus to:
   transmit, to an access node, a first indication indicating that a first terminal device is available for machine learning training for sidelink communication with data obtained from the sidelink communication;
   receive, from the access node, a second indication indicating a configuration for a machine learning bandwidth part;
   perform a machine learning training negotiation with a second terminal device using the machine learning bandwidth part; and
   execute the machine learning training with the data obtained from the sidelink communication in the machine learning bandwidth part between the first terminal device and the second terminal device.

2. An apparatus according to claim 1, wherein apparatus is further caused to perform the machine learning training negotiation with the second terminal device after transmitting a third indication comprising an announcement that the first terminal device is available for the machine learning training.

3. An apparatus according to claim 1, wherein apparatus is further caused to perform the machine learning training negotiation with the second terminal device after receiving a fourth indication comprising an announcement that the second terminal device is available for the machine learning training.

4. An apparatus according to claim 1, wherein the apparatus is further caused to store data obtained during the machine learning training.

5. An apparatus according to claim 4, wherein the apparatus is further caused to transmit the data obtained during the machine learning training to the access node as a response to a request received from the access node.

6. An apparatus according to claim 1, wherein the apparatus is further caused to transmit to the second terminal device training data bursts comprising labelled training data and receive, from the second terminal device, training information.

7. An apparatus according to claim 1, wherein the apparatus is further caused to receive from the second terminal device training data bursts comprising labelled training data, train an epoch and transmit, to the second terminal device, training information obtained from training the epoch.

8. An apparatus according to claim 1, wherein the apparatus is further caused to receive an out-of-band command and to relay the out-of-band command to the second terminal device.

9. An apparatus according to claim 1, wherein the apparatus is comprised in the first terminal device.

10. An apparatus comprising at least one processor, and at least one memory including a computer program code, wherein the at least one memory and the computer program code are configured, with the at least one processor, to cause the apparatus to:
    receive, from a first terminal device, a first indication indicating that the first terminal device is available for machine learning training for sidelink communication with data obtained from the sidelink communication;
    provide to the first terminal device a second indication indicating a configuration for a machine learning bandwidth part;
    receive, from a second terminal device, a third indication indicating that the second terminal device is available for the machine learning training for the sidelink communication with the data obtained from the sidelink communication;
    provide to the second terminal device a fourth indication indicating the configuration for the machine learning bandwidth part; and
    obtain from at least one of the first and the second terminal devices data obtained during the machine learning training for the sidelink communication with the data obtained from the sidelink communication between the first terminal device and the second terminal device.

11. An apparatus according to claim 10, wherein the second indication and the fourth indication further comprise an indication to store the data obtained during the machine learning training with the data obtained from the sidelink communication.

12. An apparatus according to claim 11, wherein the apparatus is further caused to:
   transmit a request to obtain the stored data during the machine learning training; and
   as a response to the request, receive the stored data obtained during the machine learning training.

13. An apparatus according to claim 10, wherein the apparatus is further caused to transmit as a multicast or as a unicast message an out-of-band-command.

14. An apparatus according to claim 10, wherein the machine learning bandwidth part is in an unlicensed spectrum.

15. A method comprising:
   transmitting, by a first terminal device to an access node, a first indication indicating that the first terminal device is available for machine learning training for sidelink communication with data obtained from the sidelink communication;
   receiving, from the access node, a second indication indicating a configuration for a machine learning bandwidth part;
   performing a machine learning training negotiation with a second terminal device using the machine learning bandwidth part; and
   executing the machine learning training with the data obtained from the sidelink communication in the machine learning bandwidth part between the first terminal device and the second terminal device.

* * * * *